UNITED STATES PATENT OFFICE.

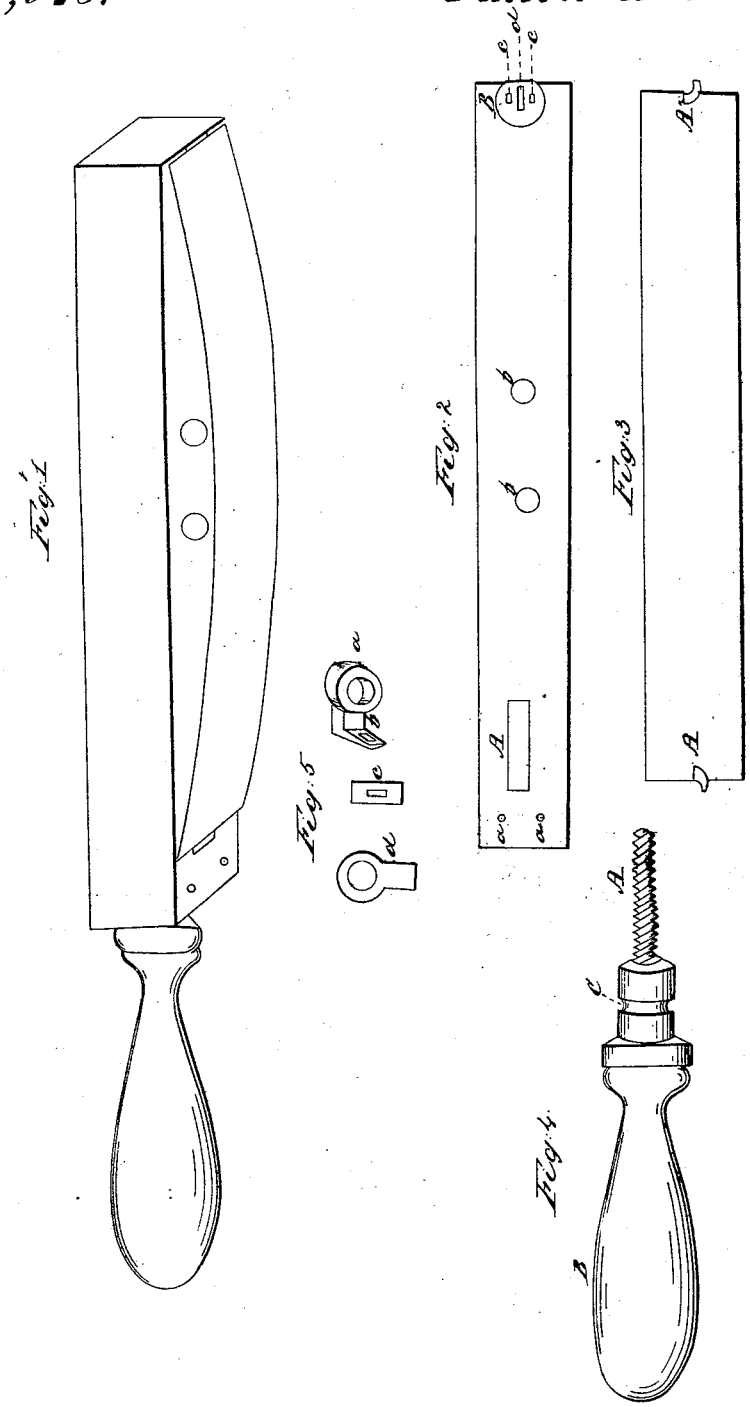

WM. D. BOARDMAN, OF RENSSELAERVILLE, NEW YORK.

RAZOR HONE OR STROP.

Specification of Letters Patent No. 2,925, dated January 20, 1843.

*To all whom it may concern:*

Be it known that I, WILLIAM D. BOARDMAN, of Rensselaerville, in the county of Albany and State of New York, have invented a new and improved Hone on a Razor-Strop.

To enable others skilled in the art to make and use my invention, I will proceed to describe its construction and operation, reference being had to the annexed drawings making a part of this specification, in which—

Figure 1 is a perspective of the hone on the strop raised in the center by the screw in the handle. Fig. 2 is the side of the strop without the handle to which the hone is affixed when used.

A in Fig. 2 is a mortise in which the nut for raising the hone moves.

B is an iron catch fastened with brads *c c*.

*d* is a hole for one of the dogs of hone to catch in.

*a a* are fastenings for handle.

*b b* are holes to contain paste for sides of the strop not covered by hone.

Fig. 3 is the side of hone which is fixed to strop. A A are dogs riveted to hone to affix the hone to the strop.

Fig. 4 is a wooden handle to the strop with an iron screw A, which is made and the shank driven in the handle before turning the same. B the wooden handle, *c* a groove or neck by which the handle is fastened in the strop block by slips of wire (*a a* Fig. 2).

Fig. 5 is a perspective view of the nut and sectional parts which can be made of brass or malleable iron or any other metal suitable.

*a* is a hole through the nut in which a thread is made to fit the thread on the screw of the handle of the strop on which the nut moves by turning the handle, *b* hole for one of the dogs A of hone to fasten in, *c* top view of nut, *d* body and back view of nut. The strop block has a hole in the end in which the nut moves corresponding in depth to the length of the screw and part of the handle which passes into it. In putting the nut and handle in the strop, the nut is first passed in the hole in the end of the strop with its top (*c* Fig. 5) foremost till it comes to the mortise (A Fig. 2) then it is turned up so that the top of the nut is on a level with the surface of the strop, then the handle is passed in and screwed into the nut till the shoulder on the handle comes up to the strop where it is to be fixed by slips of wire passed in the holes (*a a* Fig. 2). The hone is then sprung in by catching one of the dogs in the top of the nut and raising it in the center till the other dog will catch in the catch (B Fig. 2). The hone I in general make of steel plate or of any other metal of a spring temper cut to the size and form of the strop, and cover it with a composition in form of paint composed of equal parts of dry white lead and flour of emery ground in unboiled linseed oil, to which I add one part of painter's varnish and three parts of japan (a liquid used by painters as a drier in paints; it is composed of linseed oil boiled in litharge, &c.) till of a proper consistence to be applied with a brush to the hone as in painting, after applying a coat of this composition to the hones, dust them over with flour of emery as much as the composition will hold, and when dry, rub them down to a smooth and level surface, by rubbing two together or with pumice stone, then give them other coats in the same manner till sufficient is on to form a durable body of this composition. Or I make the hone as above and polish it to a level surface and instead of coating it make a paste of flour of emery and oil lard or tallow put up in boxes accompanying the hone and strop or in a hole in the strop which can be applied at the pleasure of the user by adding to a small quantity of it a few drops of oil and rubbing on with the finger.

What I claim as my invention and desire to secure by Letters Patent is—

Making a convex hone attached to a razor strop for sharpening razors of a spring so that its convexity can be increased or diminished by the attachments at the ends in manner substantially as herein described whether this be effected by means of a screw or by means of any of the known mechanical equivalents for producing analogous operations.

WILLIAM D. BOARDMAN.

Witnesses:
DAVID ADAMS, Jr.,
MARK S. DAYTON.